United States Patent [19]
Li

[11] Patent Number: 6,072,289
[45] Date of Patent: Jun. 6, 2000

[54] SYSTEM AND METHOD FOR CONTROLLING HIGH SIDE SLEW RATE IN A SPINDLE MOTOR DRIVER

[75] Inventor: Larry B. Li, Irvine, Calif.

[73] Assignee: Texas Instruments Incorporated, Dallas, Tex.

[21] Appl. No.: 09/231,524

[22] Filed: Jan. 14, 1999

Related U.S. Application Data

[60] Provisional application No. 60/083,381, Apr. 28, 1998.

[51] Int. Cl.[7] .................................................. H02P 7/00
[52] U.S. Cl. ......................... 318/254; 318/439; 318/138
[58] Field of Search ................................ 318/138, 139, 318/245, 254, 439, 800–838; 388/800, 809; 327/170, 108, 377, 437

[56] References Cited

U.S. PATENT DOCUMENTS

| | | | |
|---|---|---|---|
| 5,191,269 | 3/1993 | Carbolante | 318/254 |
| 5,397,967 | 3/1995 | Carbolante et al. | 318/254 |
| 5,589,744 | 12/1996 | Brambilla | 318/254 |
| 5,614,797 | 3/1997 | Carobolante | 318/432 |
| 5,661,383 | 8/1997 | Schlager et al. | 318/439 |
| 5,668,449 | 9/1997 | Carobolante | 318/254 |
| 5,742,193 | 4/1998 | Colli et al. | 327/170 |
| 5,859,511 | 1/1999 | Carobolante | 318/254 |
| 5,862,301 | 1/1999 | Gontowski, Jr. | 388/800 |
| 5,869,946 | 2/1999 | Carobolante | 318/811 |
| 5,920,166 | 7/1999 | Schlager et al. | 318/439 |
| 5,923,133 | 7/1999 | Menegoli | 318/254 |

*Primary Examiner*—Paul Ip
*Attorney, Agent, or Firm*—Bret J. Petersen; Frederick J. Telecky, Jr.

[57] ABSTRACT

A system for controlling slew rate in a motor control circuit for a motor comprises a high side switching device coupled to a coil of the motor, the high side switching device operable to control a voltage excitation signal applied at the coil. The system also comprises a high side slew rate control circuit operable to control a slew rate of the voltage excitation signal. The high side slew rate control circuit includes: an amplifier having an output coupled to an input of the high side switching device, a current sink coupling a first input of the amplifier to ground, a capacitor further coupling the first input of the amplifier to ground, and a feedback path from an output of the high side switching device to a second input of the amplifier.

19 Claims, 2 Drawing Sheets

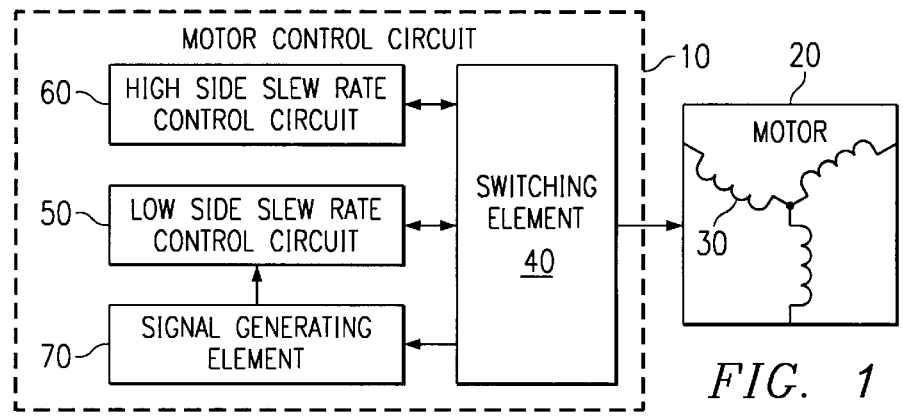
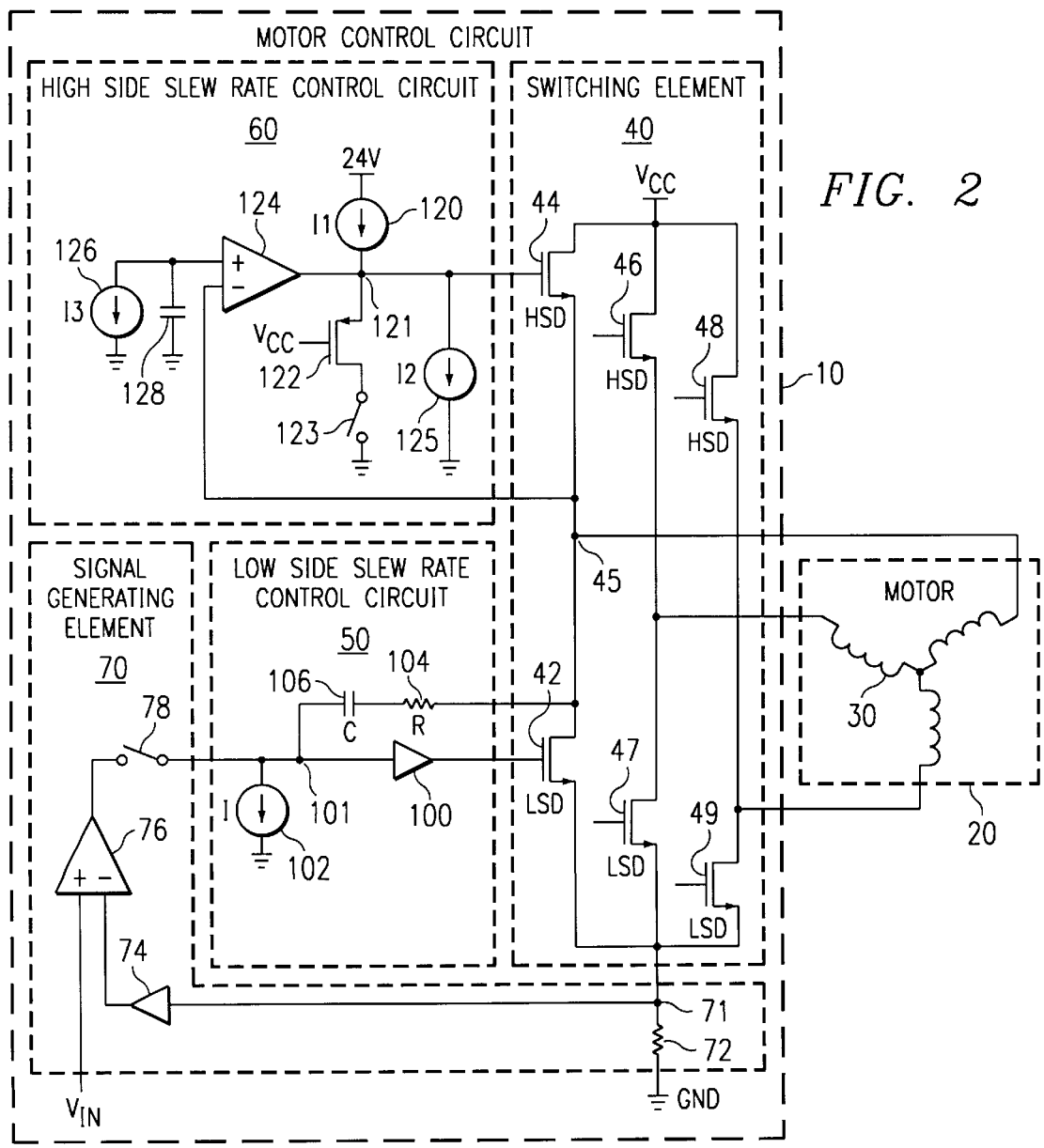

6,072,289

1

SYSTEM AND METHOD FOR CONTROLLING HIGH SIDE SLEW RATE IN A SPINDLE MOTOR DRIVER

CROSS REFERENCE TO RELATED APPLICATIONS

This application is related to pending U.S. patent application Ser. No. 9/231,513, (Attorney's Docket No. TI-23524) filed on Jan. 14, 1999, entitled *"System and Method for Controlling Low Side Slew Rate in a Spindle Motor Driver."*

This application claims benefit from provisional patent application Ser. No. 60/083,381, filed on Apr. 28, 1998, entitled *"Apparatus and Method for Controlling Slew Rate."*

TECHNICAL FIELD OF THE INVENTION

The invention relates in general to the field of control systems, and more particularly, to a system and method for controlling high side slew rate in a spindle motor driver.

BACKGROUND OF THE INVENTION

Certain memory storage devices, such as magnetic hard disk drives supporting random access, utilize a spindle setting including at least one platter covered with material for recording information. In a magnetic disk drive, for example, each platter contains a series of circular recording tracks containing sectors of information that can be read or written to by electromagnetic heads utilizing switchable magnetic fields. The platters of a spindle rotate at a constant angular speed when memory sectors are being accessed. A spindle motor, as controlled by a driving circuit, operates to generate and maintain the rotation of the spindle.

In any control system, and in particular in a control system driving a spindle motor designed to rotate at a constant angular speed, an important consideration is the reduction of electrical noise and interference. In particular, it is important to adequately reduce torque ripple, acoustic noise, and other sources of electromagnetic interference.

One way of responding undesirable electrical noise and interference is to control the slew rate of voltage excitation signals driving the phase inputs to the spindle drive motor. Slew rate is expressed as the rate of change in a voltage signal over time and has corresponding units of volts per microsecond, for example. The phase inputs are driven by switching devices such as pairs of power transistors. Spindle motor control circuits control the slew rate of the driving excitation signals by employing elements that control the rate at which the gates of the switching devices charge and discharge. However, in present control circuits, it is very difficult to control the slew rate when a spindle drive motor is operating in linear mode. Additionally, such systems experience unacceptable delays associated with such charging or discharging of the gates of the switching devices.

SUMMARY OF THE INVENTION

Accordingly, a need has arisen for an improved system and method for controlling high side slew rate in a spindle drive motor. The present invention provides a system and method for controlling high side slew rate in a spindle motor driver that addresses the shortcomings of prior systems and methods in addressing slew rate control.

In one aspect of the present invention, a system for controlling slew rate in a motor control circuit for a motor comprises a high side switching device coupled to a coil of the motor, the high side switching device operable to control

2 a voltage excitation signal applied at the coil. The system also comprises a high side slew rate control circuit operable to control a slew rate of the voltage excitation signal. The high side slew rate control circuit includes: an amplifier having an output coupled to an input of the high side switching device, a current sink coupling a first input of the amplifier to ground, a capacitor further coupling the first input of the amplifier to ground, and a feedback path from an output of the high side switching device to a second input of the amplifier.

In another aspect of the present invention, a method of controlling slew rate in a motor control circuit for a motor comprises controlling a reference voltage at a first input of an amplifier and monitoring a voltage excitation signal at an output of a high side switching device using a feedback path. The method also comprises decreasing the voltage level at a second input of the amplifier in response to decreases in the voltage excitation signal and comparing the decreasing voltage level at the second amplifier input to the reference voltage. The method further comprises increasing an amplifier output voltage in response to the voltage comparison and increasing the input voltage of the high side switching device in response to increasing the output voltage of the amplifier. Additionally, the method comprises increasing the voltage excitation signal in response to the increased input voltage of the high side switching device.

In yet another aspect of the present invention, a system for controlling slew rate in a motor control circuit for a motor comprises a high side switching device coupled to a coil of the motor, the high side switching device having a gate and a source, the high side switching device operable to control a voltage excitation signal that is applied to the coil of the motor at the source of the high side switching device in response to applying a gate voltage. The system further comprises an amplifier having an output coupled to the gate of the high side switching device, the amplifier operable to compare a reference voltage at a first input of the amplifier to the voltage excitation signal at a second input of the amplifier, the second input coupled to the source of the high side switching device, the amplifier operable to control the gate voltage of the high side switching device in response to the compared voltages. The system also comprises a current sink coupling the first input of the amplifier to ground, and a capacitor further coupling the first input of the amplifier to ground, the capacitor operable in combination with the current sink to control the reference voltage.

BRIEF DESCRIPTION OF THE DRAWINGS

For a more complete understanding of the present invention and the advantages thereof, reference is now made to the following descriptions taken in connection with the accompanying drawings in which:

FIG. 1 is a block diagram of an embodiment of a motor control circuit constructed according to the teachings of the present invention;

FIG. 2 is a more detailed circuit diagram of the embodiment of the motor control circuit of FIG. 1;

DETAILED DESCRIPTION OF THE INVENTION

Figure 3:
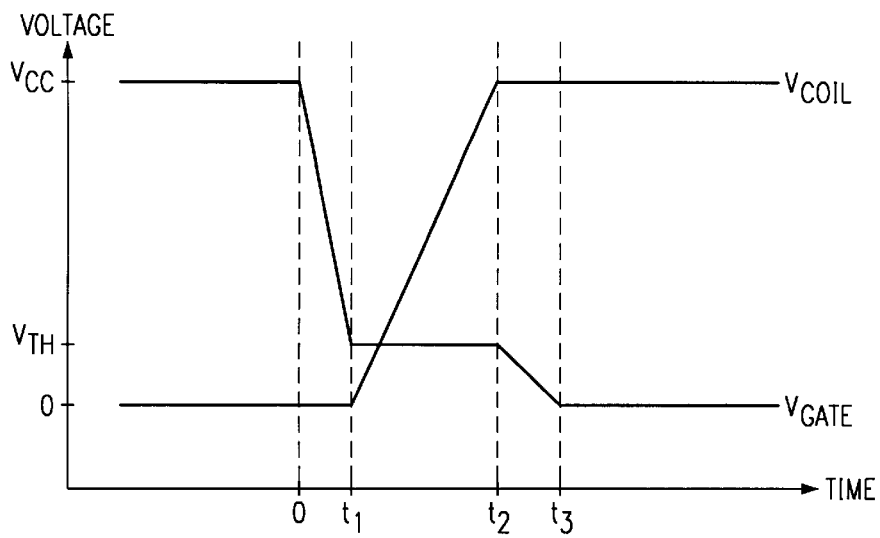
FIG. 3 is a timing diagram showing changes to voltage signals $V_{GATE}$ and $V_{COIL}$ that are associated with the operation of the low side slew rate control circuit of FIG. 2.

Embodiments of the present invention and its advantages are best understood by referring to FIGS. 1 through 5 of the drawings, like numerals being used for like and corresponding parts of the various drawings.

FIG. 1 is a block diagram of a motor control circuit 10 coupled to a motor 20. Motor control circuit 10 delivers input signals to coils 30 of motor 20, thereby causing the commutation of coils 30 to drive motor 20.

Motor 20 is a spindle drive motor well known in the hard disk drive industry. Motor 20 may be any motor having one or more coils wherein controlling the slew rate of the signals driving such coils is desired to reduce electromagnetic interference. Motor 20 includes a magnetic rotor (not shown) and is surrounded by coils 30 that are disposed around the rotor. Various combinations of voltage excitation signals are applied to coils 30 to generate current in the coils. As is generally known, passing current through coils will create an electromagnetic field operable to cause the rotor of the motor to rotate, thereby operating the spindle motor of the hard disk drive.

Motor control circuit 10 may be integrated within an application specific integrated circuit, microcontroller or other computing device. Motor control circuit 10 may also be integrated with other components or devices such that motor control circuit 10 is only a portion or smaller part of a larger motor control system. As such, other blocks and/or different communications paths between the existing blocks and/or other blocks that are not shown in FIG. 1 may be used to represent added capacity or functionality.

Motor control circuit 10 includes a switching element 40, a low side slew rate control circuit 50, a high side slew rate control circuit 60 and a signal generating element 70. Switching element 40 is coupled to or in communication with motor 20, low side and high side slew rate control circuits 50 and 60, and signal generating element 70. Low side slew rate control circuit 60 is also coupled to or in communication with signal generating element 70. A feedback path exists from switching element 40 to low side slew rate control circuit 50 via signal generating element 70.

Switching element 40 may include any combination of switches, transistors, and/or more sophisticated electrical components, that together with associated support circuitry are operable to apply a sequence of voltage excitation signals to the plurality of coils 30. Signal generating element 70 is an electrical element or combination of elements operable to sample a feedback signal from switching element 40 that is representative of the rotational speed of motor 20e Low side slew rate control circuit 50 and high side slew rate control circuit 60 are each combinations of electrical elements, whether or not integrated within an integrated circuit, that are operable to control the slew rate of voltage excitation signals being applied to the plurality of coils 30 by switching element 40.

In operation, switching element 40 of motor control circuit 10 applies voltage excitation signals in a sequential manner to each of coils 30 in order to drive motor 20. The application of the voltage excitation signals applied by switching element 40 is in part controlled by low side slew rate control circuit 50 in response to signal generating element 70. More particularly, low side and high side slew rate control circuits 50 and 60 cooperate in order to change the voltage level of voltage excitation signals that drive coils 30. The purpose of slew rate control circuits 50 and 60 is two-fold. First, slew rate control circuits 50 and 60 minimize delay associated with beginning to switch back and forth between low and high voltage levels of the voltage excitation signals in order to ensure that commutation occurs in a timely manner. Second, once the switching of such voltage levels has begun, slew rate control circuits 50 and 60 maintain control over the rate at which the voltage level of the voltage excitation signals changes in order to maintain a desired slew rate, and thereby, reduce electromagnetic interference in coils 30. The operation of motor control circuit 10, and more particularly slew rate control circuits 50 and 60, is described in further detail in the description accompanying FIGS. 2–5.

FIG. 2 is a more detailed circuit diagram of motor control circuit 10 of FIG. 1 coupled to motor 20. Switching element 40 includes three low side switching devices 42, 47 and 49, each paired in series with one of high side switching devices 44, 46 and 48, respectively. Each pair of switching devices is coupled to a particular coil of motor 20. For purposes of the remainder of the detailed description, motor control circuit 10 and its operation will be described only in reference to one pair of switching devices 42 and 44 and a respective coil 30. Low side switching device 42 and high side switching device 44 of switching element 40 may be NMOS or DMOS transistors configured as shown in FIG. 2.

A gate terminal of low side switching device 42 is coupled to low side slew rate control circuit 50 and includes a source terminal coupled to signal generating element 70 at a node 71. A drain terminal of low side switching device 42 is coupled at a node 45 to coil 30, a source terminal of high side switching device 44, and to low side slew rate control circuit 50 and high side slew rate control circuit 60. A gate terminal of high side switching device 44 is coupled high side slew rate control circuit 60 at node 121. A drain terminal of high side switching device 44 is coupled to a voltage source $V_{cc}$. The gate terminals of both low and high side switching devices 42 and 44 may be referred to herein as the inputs of such switching devices 42 and 44, while the source terminal of high side switching device 44 and the drain terminal of low side switching device 42 may be referred to herein as the outputs of such switching devices 42 and 44.

A resistive element 72 of signal generating element 70 is coupled between the source of low side switching device 42 and ground. Resistive element 72 may be a low value resistor having an impedance in the range of 0.05 ohms to 0.15 ohms, for example. A gain element 74 is coupled between the source of low side switching device 42 and a negative input terminal of an amplifier 76. Gain element 74 may be a comparator 76. Comparator 76 may be an operational transconductance amplifier or other suitable device having the capability to produce a voltage output in response to a voltage differential input. A voltage input $V_{IN}$ is coupled to a positive input terminal of comparator 76. Comparator 76 includes an output terminal coupled to a node 101 of low side slew rate control circuit via switch 78. Switch 78 may be any suitable selective isolation device.

A buffer 100 of low side slew rate control circuit 50 is coupled at an input to node 101 which is coupled to switch 78 of switching generating element 70. Buffer 100 is a low impedance unit gain buffer. A current sink 102 is coupled between node 101 and ground. Current sink 102 may draw a small current such as 10 microamperes, for example. A resistor 104 and a capacitor 106 are coupled in series between node 101 and node 45 at the drain of low side switching device. Resistor 104 and capacitor 106 comprise a feedback element which may have low resistive and capacitive values such as approximately 50 ohms and 20picofarads respectively. In one embodiment capacitor 106 may be a miller capacitor.

An amplifier 124 of high side slew rate control circuit 60 is coupled at an output to node 121 at the gate of high side switching device 44. Amplifier 124 is an operational amplifier having a high current drive capability. The positive input of amplifier 124 is coupled to a current sink 126 and a capacitor 128 that are coupled in parallel to ground. Current sink 126 may be a low sink of current and may, for example, draw a current of approximately 5 microamperes. Capacitor 128 may be a low value capacitive element with a capacitance of 20 picofarads. A current source 120 of high side slew rate control circuit 60 is coupled between a high voltage source, of 24 volts for example, and node 121. A transistor 122 and a current sink 125 are coupled in parallel between node 121 and ground. Current source 120 and current sink 125 may both have a current draw of approximately one to two milliamperes. Transistor 122 may be a PMOS transistor having a gate coupled to a voltage source $V_{cc}$, a source coupled to node 121, and a drain coupled to ground via a switch 123.

In operation, low side and high side switching devices 42 and 44 cooperate to supply voltage excitation signals to a specific coil 30 of motor 20. More particularly, the voltage level at node 45, and therefore the voltage excitation signal applied at node 45 to the specific coil 30, increases to near $V_{cc}$ when high side switching device 44 is on, and decreases to ground or other low reference voltage when low side switching device 42 is on. In such a manner, a sequence of high and low voltage level voltage excitation signals can be applied to coil 30 to cause commutation thereof. The switching of low and high side switching devices 42 and 44 is controlled by low and high side slew rate control circuits 50 and 60 as described below.

Gain element 74 provides a feedback path to comparator 76 thereby, delivering a magnified signal to comparator 76 that corresponds to a rotational speed of motor 20. More particularly, a back electromotive force of motor 20 causes current to flow through a particular coil 30 of motor 20 which also flows through resistive element 72, thereby introducing a related voltage drop across resistive element 72 that is proportional to motor speed. This voltage drop is amplified by gain element 74, which results in a final feedback voltage provided to comparator 76. Comparator 76 compares a reference voltage, $V_{IN}$, to this final feedback voltage at the negative input of comparator 76 to determine if the motor is operating at a desired speed. If the final feedback voltage does not equal the reference voltage that corresponds to a desired speed, an output voltage of comparator 76 is adjusted. The comparator output is supplied to low side slew rate control circuit 50 and used to adjust the rotational speed of motor 20. Signal generating element 70 and the relationship between the detected voltage level and $V_{IN}$ is only relevant when switch 78 is closed, corresponding to periods of time when low side switching device 42 is turned on such that a low level voltage excitation signal is applied to coil 30.

The operation of low side slew rate control circuit 50 is primarily concerned with controlling slew rate during the linear operating mode of motor 20. Low side switching device 42 is switched on by closing switch 78 of signal generating element 70, thereby providing the output voltage of comparator 76 to the gate of low side switching device 42. When the output voltage of comparator 76 is above the threshold voltage of low side switching device 42, low side switching device 42 is switched off by opening switch 78 and discharging node 101 with current sink 102. As the gate voltage of low side switching device 42 is discharged by current sink 102, the voltage level of the voltage excitation signal at node 45 increases in response to low side switching device 42 switching off. Current sink 102 ensures that the gate voltage of switching device 42 drops with little delay so that switching device 42 switches off quickly after switch 78 is opened. The delay period is referred to hereafter as a pre-slew period of low side slew rate control circuit 50.

When low side switching device 42 is on corresponding to a low level voltage excitation signal at node 45, both input and output of buffer 100 are at a high voltage level. Thereafter, switch 78 is opened when it is desirable to change the low level voltage excitation signal to a high level voltage excitation signal. As low side switching device 42 begins to turn off due to current sink 102, the resistance across low side switching device 42 increases substantially. The increase in the effective resistance of low side switching device 42 affects a similar substantial increase in the voltage level of the voltage excitation signal at node 45. This substantial increase is undesirable and is tracked by resistor 104 and capacitor 106.

Resistor 104, being of relatively small resistance such as 50 ohms, induces very little voltage drop. Thus, the voltage on the resistor 104 side of capacitor 106 can be said to be approximately the same voltage as that seen at node 45. As the voltage level rise at node 45 occurred at a high rate of frequency, a roughly equivalent rise in voltage level occurs on the buffer 100 side of capacitor 106. Thus, the original voltage drop at the input of buffer 100 or node 101 will be brought back up to some intermediate value between its original value and the voltage level seen at node 45. This acts to offset too rapid a voltage reduction at the buffer input, which causes an excessive slew rate in voltage excitation signals applied at node 45.

Buffer 100 will then reflect this new input voltage signal to its output and therefore to the gate of low side switching device 42, thus ensuring that any change to the gate voltage of high side switching device 42 is gradual. With no sudden change in the gate voltage of high side switching device 42, changes to the effective resistance of low side switching device 42 will be correspondingly gradual. In this manner, the slew rate of the voltage excitation signal at node 45 and applied to a respective coil 30 is controlled.

The operation of low side slew rate control circuit 50 during linear operation of motor 20 is shown in the timing diagram of FIG. 3 with respect to the gate voltage of low side switching device 42, $V_{GATE}$, and the voltage level at node 45, $V_{COIL}$. More specifically, from zero to t1, the timing diagram shows a rapid rate of change in $V_{GATE}$ during pre-slew operation when slew rate control is unnecessary, ensuring that the switching of low side switching device 42 occurs with minimal delay. Time t2 is at the point where low side switching device 42 begins to turn off. Using low slew rate control circuit 50 of the present invention, it can be seen that the rate of change to the voltage level at node 45 is not an instantaneous change and is in accordance with a desired slew rate as controlled by low side slew rate control circuit 60. Ideally, the slope of line VCOIL between times t1 and t2 should approximate the desired slew rate of the voltage excitation signal applied at node 45. The timing diagram also shows times t2 to t3, corresponding to a period during which low side switching device 42 is completely off.

High side slew rate control circuit 60 operates to control the slew rate as a voltage excitation signal applied to a respective coil 30 decreases in strength. High side slew rate control circuit 60 is used to control slew rate both in linear and pulse-width modulation mode of motor 20 as high side switching device 44 is switched off. As high side slew rate control circuit 60 is used in different modes of motor 20 operation, the operation of high side slew rate control circuit 60 differs depending on the present mode of motor 20.

In both linear and pulse-width modulation mode of motor 20, in order to turn off high side switching device 44, high side slew rate control circuit 60 must first discharge the gate of high side switching device 44 from approximately twenty-four volts to approach the threshold voltage of high side switching device 44. This is referred to hereafter as pre-slew operation of high side slew rate control circuit 60. High side switching device 44 does not begin to turn off until the gate voltage reaches the threshold voltage. The slew rate of the voltage excitation signal at node 45 is not yet a concern because no change in the voltage excitation signal occurs until high side switching device 44 begins to turn off. Therefore, transistor 122, coupled to the gate of high side switching device 44, operates to rapidly discharge the gate until such threshold voltage is reached. The gate voltage of transistor 122 is held at a voltage $V_{cc}$ of approximately 12 volts, thus ensuring that transistor 122 remains on until the voltage at the gate of high side switching device 44 reaches 12.7 volts. When the gate of high side switching device reaches 12.7 volts, transistor 122 begins to turn off, thus preventing any further voltage drop from the gate of high side switching device 44. Thus, transistor 122 operates similarly to a current sink by draining current from the gate of high side switching device 44, thereby lowering the gate voltage of high side switching device 44, until transistor 122 is turned off. Switch 123 is closed during periods of time when high side switching device 44 is switched off to enable transistor 122.

In pulse-width modulation mode, current source 120 and current sink 125 cooperate to effectively control the slew rate of the voltage excitation signal at node 45 once the gate of high side switching device 44 has reached its threshold voltage. Current source 120 and current sink 125 act to charge and discharge the gate of high side switching device 44 by pushing or pulling current when high side switching device 44 is being turned on and off respectively. Changing the gate voltage of high side switching device 44 is operable to control its switching, thereby controlling the slew rate of voltage excitation signals applied at node 45.

In pulse-width modulation mode, the slew rate can be expressed as the gate capacitance of high side switching device 44 divided by the level of current pushed or pulled by current source 120 or current sink 125. Thus, by controlling the level of current supplied by current source 120 and current sink 125, the slew rate of voltage excitation signals applied at node 45 may be controlled both when high side switching device 44 is being turned on and off.

Figure 4:
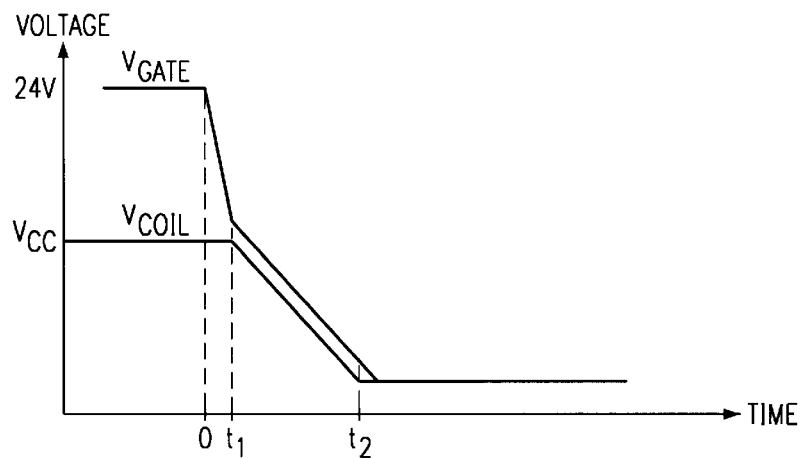
FIG. 4 is a timing diagram showing changes to voltage signals $V_{GATE}$ and $V_{COIL}$ that are associated with the operation of the high side slew rate control circuit of FIG. 2 during pulse width modulation motor operation.

Referring now to the timing diagram of FIG. 4, it can be seen that, during pulse-width modulation operation of motor 20, the gate voltage of high side switching device 44, $V_{GATE}$, drops at a significant rate during pre-slew operation between 0 to t1, where 0 denotes the time at which switch 123 is closed. Such a period corresponds to the time during which transistor 122 drains current in order to reduce $V_{GATE}$ to near threshold voltage. When $V_{GATE}$ reaches the threshold voltage, switching device 44 begins to turn off at t1. Current source 120 and current sink 125 thereafter control a gradual decrease in the voltage excitation signal, $V_{COIL}$, until time t2 when switching device 44 is completely turned off. Thus, the time period from t1 to t2 is more closely controlled by current source 120 and current sink 125 to obtain a desired slew rate of the voltage excitation signal. Ideally, the slope of line $V_{COIL}$ between times t1 and t2 should approximate the desired slew rate of the voltage excitation signal applied at node 45.

Referring now back to FIG. 2, after the gate voltage of high side switching device 44 reaches the threshold voltage of high side switching device 44 during linear operation of motor 20, current sink 125 continues to discharge the gate voltage. As the gate discharges, the effective resistance of high side switching device 44 increases substantially, resulting in a substantial drop in the voltage level of the voltage excitation signal at node 45. Amplifier 124 compares the decreasing level of the voltage excitation signal to a reference voltage as the gate voltage of switching device continues to discharge. The reference voltage is also being discharged by current sink 126, which controls, in combination with capacitor 128, the slew rate of the reference voltage as expressed by the capacitance of capacitor 128 over the level of current supplied by current sink 126. If the rate of change to the voltage level of the voltage excitation signal exceeds the change to the reference voltage, amplifier 124 increases the gate voltage of high side switching device 44 until the two compared voltages are equivalent. This increase in gate voltage reduces the effective resistance across high side switching device 44, resulting in a voltage level at node 45 that more closely approximates the voltage at the positive input of amplifier 124. Thus, with the voltage level at node 45 closely tracking the voltage at the positive input to amplifier 124, current sink 126 and capacitor 128 effectively control the rate at which the voltage level of the voltage excitation signal at node 45 changes with respect to time.

Figure 5:
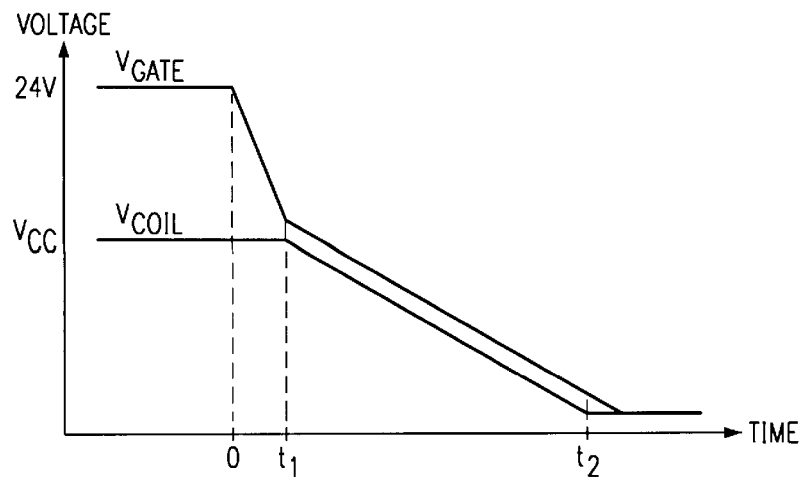
FIG. 5 is a timing diagram showing changes to voltage signals $V_{GATE}$ and $V_{COIL}$ that are associated with the operation of the high side slew rate control circuit of FIG. 2 during linear motor operation.

The operation of high side slew rate control circuit 60 during linear operation of motor 20 is shown in the timing diagram of FIG. 5 with respect to the gate voltage of high side switching device 44, $V_{GATE}$, and the voltage level of the voltage excitation signal at node 45, $V_{COIL}$. Prior to t1, the timing diagram shows a rapid change in $V_{GATE}$ during pre-slew operation when slew rate control is unnecessary, thereby resulting in minimal delay. At t2 when high side switching device 44 begins to turn off, the timing diagram shows more gradual changes to $V_{GATE}$ and $V_{COIL}$ between times t1 and t2. Using high slew rate control circuit 60, the rate of change to the voltage excitation signal closely tracks the reference voltage at the positive input of amplifier 124. Ideally, the slope of line $V_{COIL}$ between times t1 and t2 should approximate the desired slew rate of the voltage excitation signal applied at node 45.

Although the present invention is described in FIG. 2 as including both low side slew rate control circuit 50 and high side slew rate control circuit 60, it should be noted that only one of such circuits may be required to reduce switching delays and/or the level of electromagnetic interference in a motor control system such as motor control circuit 10. Such an embodiment would remain within the scope of this invention. For example, previous implementations of a high side slew rate control circuit could be used with low side slew rate control circuit 50 of the present invention and still achieve appreciable advantages over previous control systems.

One advantage of the present invention is that it offers an improved apparatus and method for controlling high side slew rate in a spindle drive motor. The present invention also allows for accurate control of high side slew rate of voltage input signals that drive the phases of a spindle drive motor. A further advantage of the present invention is that slew rate is controlled without an accompanying long delay in the charging and discharging of the gate voltage of the power devices that trigger such voltage input signals. Yet another advantage of the present invention is a reduction of electromagnetic interference that is caused by rapid changes in the strength of the voltage input signals. Other technical advantages are readily apparent to one skilled in the art from the preceding figures and descriptions, as well as the following claims.

Although the present invention and its advantages have been described in detail, it should be understood that various changes, substitutions, and alterations can be made therein without departing from the spirit and scope of the present invention as defined by the appended claims.

What is claimed is:

1. A system for controlling slew rate in a motor control circuit for a motor, the system comprising:
   a high side switching device coupled to a coil of the motor, the high side switching device operable to control a voltage excitation signal applied at the coil; and
   a high side slew rate control circuit operable to control a slew rate of the voltage excitation signal, the high side slew rate control circuit including:
      an amplifier having an output coupled to an input of the high side switching device,
      a current sink coupling a first input of the amplifier to ground,
      a capacitor further coupling the first input of the amplifier to ground,
      a feedback path from an output of the high side switching device to a second input of the amplifier, and
      a transistor coupled to the amplifier output and ground, the transistor operable to reduce the voltage at the high side switching device input to the input threshold voltage of the high side switching device.

2. The system of claim 1, wherein the transistor coupled between the amplifier output and ground is connected to ground through a switch and has an input connected to a reference voltage.

3. The system of claim 1, wherein the high side slew rate control circuit further comprises a current source and a second current sink, the current source and the second current sink both coupled to a node between the amplifier output and the high side switching device input, the current source and the second current sink operable to control the slew rate of the voltage excitation signal during pulse-width modulation operation of the motor.

4. The system of claim 3, wherein the amplifier is a differential amplifier operable to compare two voltages at its first and second inputs, the differential amplifier generating an output voltage in response to the input voltages.

5. The system of claim 4, wherein the capacitor and the current sink are coupled in parallel between the first input of the amplifier and ground, the capacitor and the current sink operable in combination to control a desired slew rate of the voltage excitation signal.

6. The system of claim 5, wherein the amplifier output is coupled to the gate of the high side switching device, and the feedback path is from the source of the high side switching device to the second input of the amplifier, the amplifier output being operable to control a voltage level of the applied voltage excitation signal at the output of the high side switching device.

7. The system of claim 1, wherein the high side switching comprises a transistor having a source coupled to the coil of the motor.

8. The system of claim 1, wherein the amplifier is a differential amplifier operable to control an input voltage of the high side switching device by comparing a voltage level of the voltage excitation signal at the first input of the amplifier to a reference voltage at the second input of the amplifier.

9. A method of controlling slew rate in a motor control circuit for a motor, the method comprising:
   controlling a reference voltage at a first input of an amplifier;
   monitoring a voltage excitation signal at an output of a high side switching device using a feedback path;
   decreasing the voltage level at a second input of the amplifier in response to decreases in the voltage excitation signal;
   comparing the decreasing voltage level at the second amplifier input to the reference voltage;
   rapidly discharging the voltage at the gate of the high side switching device to about its threshold voltage, and
   controlling the slew rate of the high side switching device after reaching the threshold voltage cooperatively with a current source and current sink connected to the gate of the high side switching device.

10. The method of claim 9, wherein controlling the reference voltage comprises reducing the reference voltage at a desired rate.

11. The method of claim 9, wherein controlling a reference voltage comprises reducing the reference voltage by controlling the strength of a current sink relative to a capacitor having a known capacitance, the current sink cooperating with the capacitor to reduce the reference voltage according to a predetermined slew rate.

12. The method of claim 9, wherein comparing the decreasing voltage level to the controlled reference voltage comprises comparing two inputs of a differential amplifier.

13. The method of claim 9, wherein comparing the decreasing voltage level to the controlled reference voltage comprises comparing the decreasing voltage level to the controlled reference voltage to compare a slew rate of the decreasing voltage level relative to a second slew rate of the decreasing reference voltage.

14. The method of claim 9, wherein increasing the input voltage of the high side switching device comprises increasing a gate voltage of a transistor, and wherein increasing the voltage excitation signal comprises increasing a source voltage of the transistor by increasing the effective resistance of the transistor.

15. A system for controlling slew rate in a motor control circuit for a motor, the system comprising:
   a high side switching device coupled to a coil of the motor, the high side switching device operable to control a voltage excitation signal applied at the coil; and
   a high side slew rate control circuit operable to control a slew rate of the voltage excitation signal, the high side slew rate control circuit including:
      an amplifier having an output coupled to an input of the high side switching device,
      a current sink coupling a first input of the amplifier to ground,
      a capacitor further coupling the first input of the amplifier to ground, and
      a feedback path from an output of the high side switching device to a second input of the amplifier, and
      wherein the high side slew rate control circuit further comprises a current source and a second current sink, the current source and the second current sink both coupled to a node between the amplifier output and the high side switching device input, the current source and the second current sink operable to control the slew rate of the voltage excitation signal during pulse-width modulation operation of the motor.

16. The system of claim 15, wherein the high side slew rate control circuit further comprises a transistor coupled to the amplifier output and ground, the transistor operable to reduce the voltage at the high side switching device input to the input threshold voltage of the high side switching device.

17. The system of claim 16, wherein the transistor coupled between the amplifier output and ground is connected to ground through a switch and has an input connected to a reference voltage.

18. The system of claim 15, wherein the capacitor and the current sink are coupled in parallel between the first input of the amplifier and ground, the capacitor and the current sink operable in combination to control a desired slew rate of the voltage excitation signal.

19. The system of claim 18, wherein the amplifier output is coupled to the gate of the high side switching device, and the feedback path is from the source of the high side switching device to the second input of the amplifier, the amplifier output being operable to control a voltage level of the applied voltage excitation signal at the output of the high side switching device.

* * * * *